United States Patent
Lee et al.

(10) Patent No.: US 9,075,270 B2
(45) Date of Patent: Jul. 7, 2015

(54) LIQUID CRYSTAL DISPLAY DEVICE

(75) Inventors: Jeong-Yun Lee, Seoul (KR);
Young-Sup Jung, Seoul (KR);
Hang-Sup Cho, Paju-si (KR); Doo-Hee Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 146 days.

(21) Appl. No.: 13/546,851

(22) Filed: Jul. 11, 2012

(65) Prior Publication Data

US 2013/0027625 A1 Jan. 31, 2013

(30) Foreign Application Priority Data

Jul. 28, 2011 (KR) .................. 10-2011-0075241

(51) Int. Cl.
*G02F 1/1343* (2006.01)

(52) U.S. Cl.
CPC ...... *G02F 1/134363* (2013.01); *G02F 1/13439* (2013.01); *G02F 2001/134318* (2013.01)

(58) Field of Classification Search
CPC .................................................. G02F 1/13439
USPC .................................. 349/147, 43, 143, 139
See application file for complete search history.

(56) References Cited

U.S. PATENT DOCUMENTS

| 7,605,898 | B2* | 10/2009 | Ochiai et al. | 349/143 |
| 2003/0107037 | A1 | 6/2003 | Youn et al. | |
| 2005/0200791 | A1* | 9/2005 | Ahn | 349/141 |
| 2006/0077324 | A1* | 4/2006 | Ahn | 349/114 |
| 2007/0002246 | A1* | 1/2007 | Chang et al. | 349/141 |
| 2007/0146605 | A1* | 6/2007 | Park et al. | 349/141 |
| 2008/0284967 | A1* | 11/2008 | Oh et al. | 349/144 |
| 2009/0059110 | A1* | 3/2009 | Sasaki et al. | 349/39 |
| 2010/0225869 | A1* | 9/2010 | Ahn et al. | 349/147 |
| 2010/0328591 | A1* | 12/2010 | Oh et al. | 349/114 |
| 2011/0019144 | A1* | 1/2011 | Koh et al. | 349/143 |

* cited by examiner

*Primary Examiner* — Sang V Nguyen
(74) *Attorney, Agent, or Firm* — Birch, Stewart, Kolasch & Birch, LLP

(57) ABSTRACT

A liquid crystal display device is discussed, which includes a substrate; gate and data lines crossing each other on the substrate to thereby define a pixel region; a thin film transistor connected to the gate and data lines; and a plurality of pixel electrodes and a plurality of first common electrodes alternating with each other in the pixel region and configured to induce an in-plane electric field, and each including a first layer and a second layer on the first layer, wherein the first layer is made of an opaque metal and has a first thickness, and the second layer is made of a transparent conductive material and has a second thickness.

17 Claims, 5 Drawing Sheets

LIQUID CRYSTAL DISPLAY DEVICE

CROSS REFERENCE TO RELATED APPLICATION

This application claims priority to and the benefit of Korean Patent Application No. 10-2011-0075241, filed in Korea on Jul. 28, 2011, which is hereby incorporated by reference for all purposes as if fully set forth herein.

BACKGROUND OF THE INVENTION

1. Field of the Invention

Embodiments of the invention relate to a liquid crystal display device, and more particularly, to an in-plane switching mode liquid crystal display device and a method of manufacturing the same.

2. Discussion of the Related Art

Until recently, display devices have typically used cathode-ray tubes (CRTs). Presently, however, many efforts and studies are being made to develop various types of flat panel displays, such as liquid crystal display (LCD) devices, plasma display panels (PDPs), field emission displays, and electroluminescence displays (ELDs), as substitutes for the CRTs. Of these flat panel displays, LCD devices have many advantages, such as high resolution, light weight, thin profile, compact size, and low voltage power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into the direction of the induced electric field, thereby changing the light transmissivity of the LCD device. Thus, the LCD device displays images by varying the intensity of the induced electric field.

The LCD device using an electric field induced in a vertical direction has disadvantage in viewing angles. To solve this problem, an in-plane switching (IPS) mode LCD device using an in-plane electric field is proposed.

FIG. 1 is a schematic cross-sectional view illustrating an IPS mode LCD device according to a related art.

Referring to FIG. 1, the IPS mode LCD device 1 includes an array substrate 10, a color filter substrate 9 and a liquid crystal layer 11. The array substrate 10 includes pixel and common electrodes 30 and 17 alternately arranged to produce an in-plane electric field L. The liquid crystal layer 11 is operated by the electric field L.

FIGS. 2A and 2B are schematic views illustrating operations in ON and OFF states, respectively, of the IPS mode LCD device according to the related art.

Referring to FIG. 2A, in the ON state, alignment of liquid crystal molecules 11a over the pixel and common electrodes 30 and 17 is not changed while alignment of liquid crystal molecules 11b over a region between the pixel and common electrodes 30 and 17 is changed and aligned along the electric field L. In other words, since the liquid crystal molecules 11a and 11b are operated by the in-plane electric field L, viewing angles is widened. Accordingly, the IPS mode LCD device has wide viewing angles of about 80 degrees to about 89 degrees in up/down/right/left directions.

Referring to FIG. 2B, in the OFF state, an in-plane electric field is not induced between the pixel and common electrodes 30 and 17, and arrangement of the liquid crystal molecules 11a and 11b is not changed.

FIG. 3 is a cross-sectional view illustrating a pixel region of the IPS mode LCD device according to the related art.

Referring to FIG. 3, a gate insulating layer 48 is formed on a substrate 40, a data line 50 is formed on the gate insulating layer 48, a passivation layer 60 is formed on the data line 50, and pixel and common electrodes 64 and 62 are formed on the passivation layer 60. The pixel and common electrodes 64 and 62 alternate in a pixel region P.

Although not shown in the drawings, a gate line and a common line are formed below the gate insulating layer 48, and a thin film transistor is formed near the crossing portion of the gate line and the data line 50. The gate line and the data line 50 define the pixel region P. The thin film transistor includes a gate electrode, a semiconductor layer, and source and drain electrodes.

The pixel electrode 64 is connected to the drain electrode, and the common electrode 62 is connected to the common line. The pixel and common electrodes 64 and 62 have a bar shape.

The pixel and common electrodes 64 and 62 are formed with a single-layered structure using a transparent conductive material or an opaque metal.

The related art LCD device has a high light reflectance, about 60% or more, because of the common and pixel electrodes 62 and 64 under external circumstances. This causes rainbow spot or the like and reduction of ambient contrast ratio, and display quality is thus reduced.

SUMMARY OF THE INVENTION

Accordingly, embodiments of the invention are directed to a liquid crystal display device which substantially obviates one or more of the problems due to limitations and disadvantages of the related art, and to other advantages.

An advantage of the embodiments of the invention is to provide a liquid crystal display device that can improve display quality.

Additional features and advantages of the embodiments of the invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the invention, as embodied and broadly described herein, a liquid crystal display device includes: a substrate; gate and data lines crossing each other on the substrate to thereby define a pixel region; a thin film transistor connected to the gate and data lines; and a plurality of pixel electrodes and a plurality of first common electrodes alternating with each other in the pixel region and configured to induce an in-plane electric field, and each including a first layer and a second layer on the first layer, wherein the first layer is made of an opaque metal and has a first thickness, and the second layer is made of a transparent conductive material and has a second thickness.

In another aspect, a liquid crystal display device includes a substrate; gate and data lines crossing each other on the substrate to thereby define a pixel region; a thin film transistor connected to the gate and data lines; and a plurality of pixel electrodes and a plurality of common electrodes alternating with each other in the pixel region and configured to induce an in-plane electric field, and the plurality of pixel electrodes or the plurality of common electrode include a first layer and a second layer on the first layer, wherein the first layer is made of an opaque metal and has a first thickness, and the second layer is made of a transparent conductive material and has a second thickness.

It is to be understood that both the foregoing general description and the following detailed description are by way of example and explanatory, and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS

Reference will now be made in detail to the example embodiments of the invention, which are illustrated in the accompanying drawings.

Figure 1:
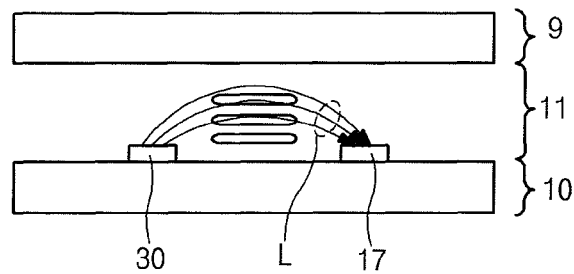
FIG. 1 is a schematic cross-sectional view illustrating an IPS mode LCD device according to a related art.
Figure 2A:
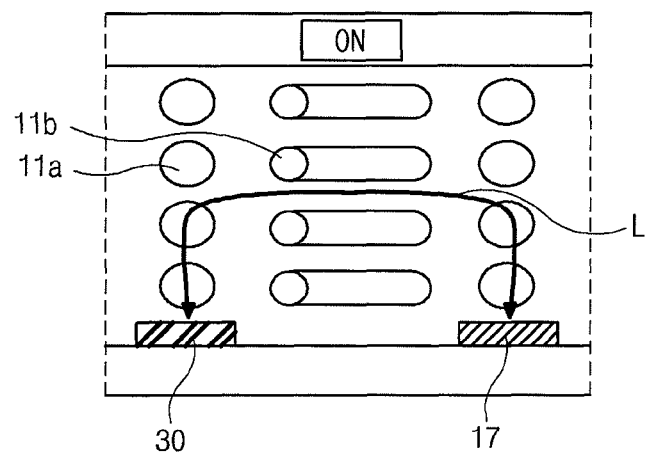
FIGS. 2A and 2B are schematic views illustrating operations in ON and OFF states, respectively, of the IPS mode LCD device according to the related art.
Figure 2B:
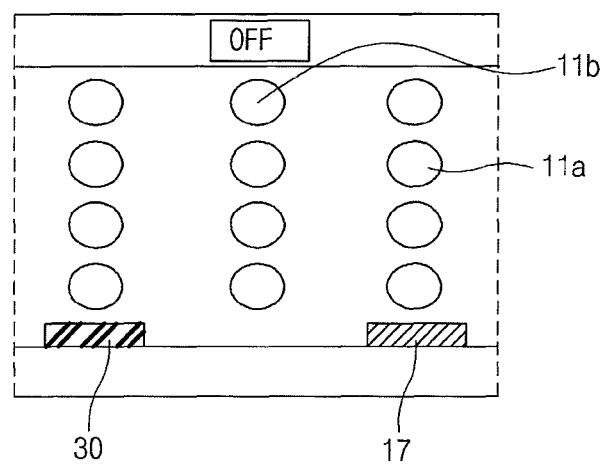
Figure 3:
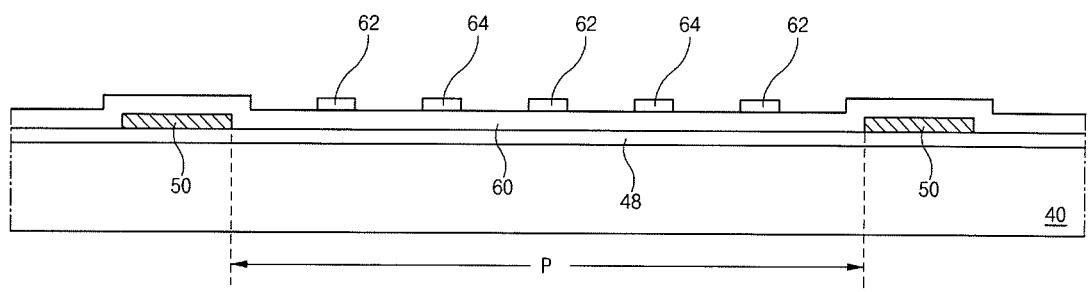
FIG. 3 is a cross-sectional view illustrating a pixel region of the IPS mode LCD device according to the related art.
Figure 4:
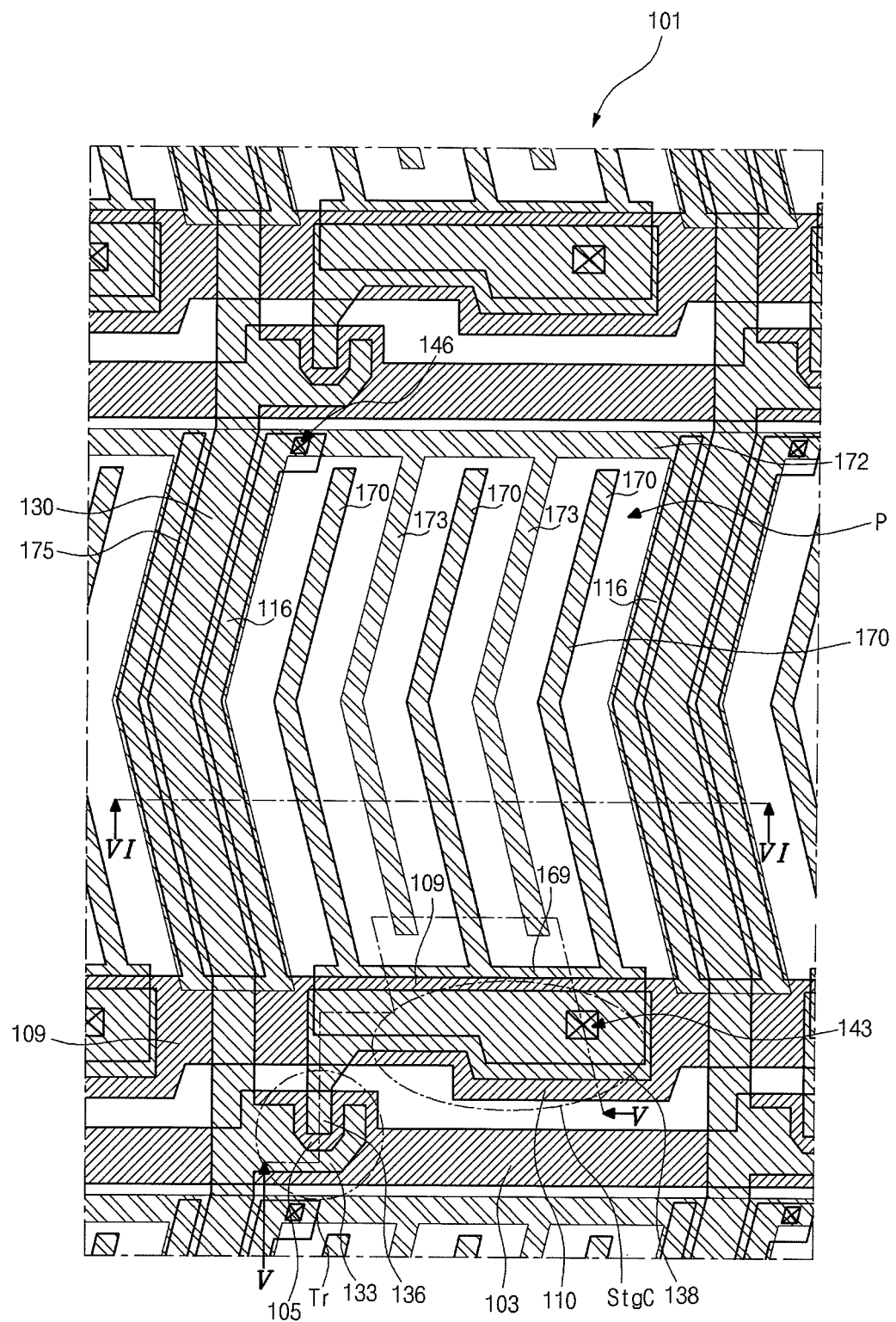
FIG. 4 is a plan view illustrating an IPS mode LCD device according to an embodiment of the invention.

FIG. 4 is a plan view illustrating an IPS mode LCD device according to a first embodiment of the invention.

Referring to FIG. 4, the LCD device 101 includes an array substrate 102, an opposing substrate, and a liquid crystal layer between the array substrate 102 and the opposing substrate.

The array substrate 102 includes a gate line 103 and a data line 130 crossing each other with a gate insulating layer to thereby define a pixel region P. A common line 109 is spaced apart from the gate line 103 and may be made of the same material as the gate line 103.

A thin film transistor Tr is formed near the crossing portion of the gate and data lines 103 and 130.

The thin film transistor Tr includes a gate electrode 105, the gate insulating layer, a semiconductor layer, and source and drain electrodes 133 and 136.

A first common electrode 116 is formed at each of both sides of the pixel region P. The first common electrode 116 extends from the common line 109 and is parallel with the data line 130.

An auxiliary common pattern 172 is formed in the pixel region P. The auxiliary common pattern 172 contacts the first common electrode 116 through a common contact hole 146. A plurality of second common electrodes 173 extend from the auxiliary common pattern 172. The second common electrode 173 has the same shape as the first common electrode 116. The second common electrodes 173 are between the first common electrodes 116 located at the both sides of the pixel region P.

As shown in FIG. 4, the auxiliary common pattern 172 may be formed at a peripheral region of the pixel region P overlapping the data line 130 and the first common electrode 116 so that it can function as a black matrix to prevent light leakage. Alternatively, the auxiliary common pattern 172 may be configured such that portions of the auxiliary common pattern 172 corresponding to the data line 130 are eliminated and the auxiliary common pattern 172 has only a portion in the pixel region P.

An auxiliary pixel pattern 169 may contact the drain electrode 136 through a drain contact hole 143 and overlap the common line 109. A plurality of pixel electrodes 170 extend from the auxiliary pixel pattern 169 and alternate with the second common electrodes 173. The pixel electrode 170 has the same shape as the second common electrode 173. The pixel electrodes 170 are between the first common electrodes 116 located at the both sides of the pixel region P.

The pixel electrode 170 and the first and second common electrodes 116 and 173 may have a bent shape with respect to a center of the pixel region P. For example, the pixel electrode 170 and the first and second common electrodes 116 and 173 are bent with respect to a virtual line parallel with the gate line 103. This configuration forms two different domains (i.e., dual domains) in the pixel region P. This dual-domain configuration prevents or reduces color difference according to variation of viewing angles and thereby improves display quality.

The data line 130 has the same bent portion as the pixel electrode 170 and the first and second common electrodes 116 and 173. Accordingly, the data line 130 has a zigzag shape overall.

Alternatively, the pixel electrode 170, the first and second common electrodes 116 and 173, and the data line 130 may have a shape other than the bent shape, for example, a straight shape.

In the pixel region P, the common line 109 and the drain electrode 136 overlapping each other with the gate insulating layer therebetween form a storage capacitor StgC. A portion of the common line 109 and a portion of the drain electrode 136 overlapping each other are referred to as first and second storage electrodes 110 and 138, respectively.

Each of the pixel and second common electrodes 170 and 173 is configured to have a double-layered structure to have light reflectance of 35% or less for ambient light.

In this instance, a lower layer of the double-layered structure may be made of at least one of molybdenum (Mo), molybdenum-titanium (MoTi), copper (Cu) and copper nitride (CuNx), and an upper layer of the double-layered structure may be made of at least one of indium-tin-oxide (ITO), indium-zinc-oxide (IZO) and aluminum-doped zinc oxide (AZO).

Figure 5:
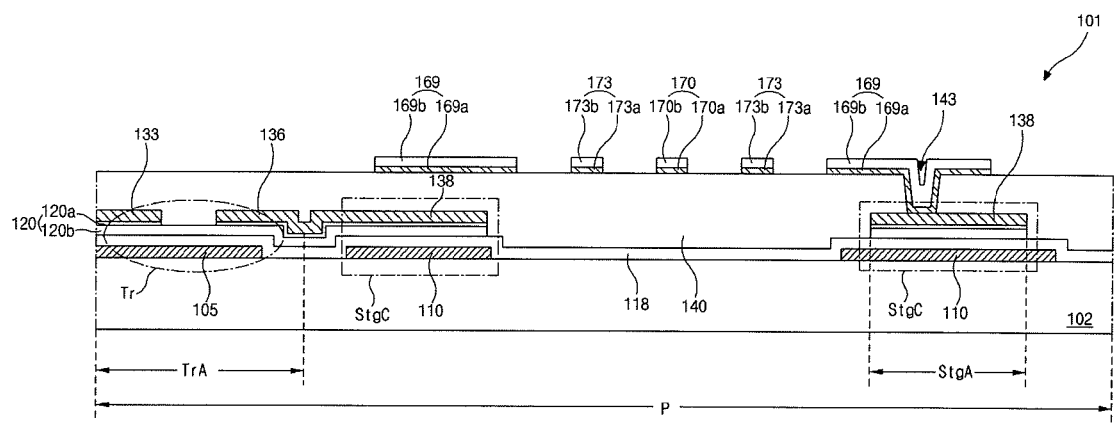
FIGS. 5 and 6 are cross-sectional views taken along lines V-V and VI-VI of FIG. 4, respectively.
Figure 6:
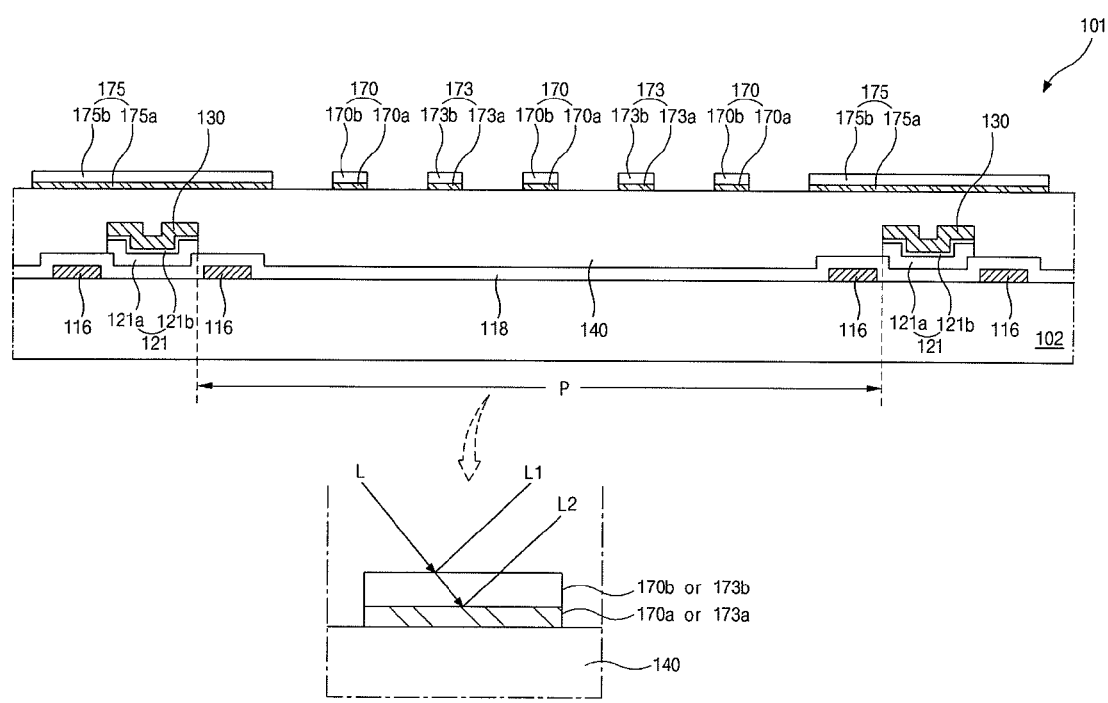

FIGS. 5 and 6 are cross-sectional views taken along lines V-V and VI-VI of FIG. 4, respectively. For the purpose of explanations, a region where a thin film transistor Tr is formed is defined as a switching region TrA, and a region where a storage capacitor StgC is formed is defined as a storage region StgA.

Referring to FIGS. 4 and 5, a gate line (103 of FIG. 4) is formed on a transparent substrate 102, and a common line (109 of FIG. 4) is spaced apart from and parallel with the gate line 103. A portion of the gate line 103 corresponding to the switching region TrA functions as a gate electrode 105.

In a pixel region P, a first common electrode 116 extending from the common line 109 is formed near a data line 130. In the storage region StgA, a portion of the common line 109 functions as a first storage electrode 110.

A gate insulating layer 118 is formed on the gate line 103, the gate electrode 105, the common line 109 and the first common electrode 116. The gate insulating layer 118 is made of silicon oxide ($SiO_2$) or silicon nitride (SiNx).

A semiconductor layer 120 is formed on the gate insulating layer 118 in the switching region TrA. The semiconductor layer 120 includes an active layer 120a of intrinsic amorphous silicon and an ohmic contact layer 120b of extrinsic amorphous silicon on the active layer 120a.

The data line 130 crossing the gate line 103 to define the pixel region P is formed on the gate insulating layer 118. A semiconductor pattern 121 may be formed below the data line 130 and include first and second patterns 121a and 121b which are formed of the same materials as the active layer 120a and the ohmic contact layer 120b, respectively. Alternatively, the semiconductor pattern 121 may be omitted.

In the switching region TrA, a source electrode 133 extending from the data line 130 and a drain electrode 136 spaced apart from the source electrode 133 are formed on the semiconductor layer 120. The source and drain electrodes 133 and 136 contact the ohmic contact layer 120b therebelow.

The gate electrode 105, the gate insulating layer 118, the semiconductor layer 120, and the source and drain electrodes 133 and 136 form the thin film transistor Tr.

In the storage region StgA, the drain electrode 136 extends over the first storage electrode 110 to form a second storage electrode 138. The first and second storage electrodes 110 and 138 and the gate insulating layer therebetween form the storage capacitor StgC.

A passivation layer 140 is formed on the data line 130, the source and drain electrodes 133 and 136 and the second storage electrode 138. The passivation layer 140 is made of an organic insulating material having a relatively low dielectric constant, for example, photo acrylic. The passivation layer 140 is for minimizing a parasitic capacitance produced by overlap between the data line 130 and the first common electrode 116, and a conductive pattern 175 thereon, and minimizing an effect of an unwanted electric field between the data line 130 and the first common electrode 116.

The passivation layer 140 includes a common contact hole (146 of FIG. 4) exposing an end of the first common electrode 116, and a drain contact hole 143 exposing the drain electrode 136 and accessing the second storage electrode 138.

An auxiliary common pattern (172 of FIG. 4) and an auxiliary pixel pattern 169 are formed on the passivation layer 140 in the pixel region P. The auxiliary common pattern 172 and the auxiliary pixel pattern 169 are located at the opposite sides of the pixel region P and face each other.

Each of the auxiliary common pattern 172 and the auxiliary pixel pattern 169 has a double-layered structure, which includes a lower layer made of an opaque metal material, for example, at least one of molybdenum (Mo), molybdenum-titanium (MoTi), copper (Cu) and copper nitride (CuNx), and an upper layer made of a transparent conductive material, for example, at least one of indium-tin-oxide (ITO), indium-zinc-oxide (IZO) and aluminum-doped zinc-oxide (AZO).

The auxiliary common pattern 172 contacts the first common electrode 116 through the common contact hole 146, and the auxiliary pixel electrode 169 contacts the second storage electrode 138 through the drain contact hole 143.

The conductive pattern 175 extending from the auxiliary common pattern 172 is formed on the passivation layer 140 overlapping the data line 130 and the first common electrode 116. Accordingly, the conductive pattern 175 functions as a black matrix. Alternatively, the conductive pattern 175 may be omitted.

A plurality of second common electrode 173 extending from the auxiliary common pattern 172 are formed on the passivation layer 140 in the pixel region P and has the double-layered structure. The second common electrodes 173 are located between the first common electrodes 116 at both sides of the pixel region P. The second common electrode 173 extends over the pixel region P and has a bar shape like the first common electrode 116.

A plurality of pixel electrodes 170 extending from the auxiliary pixel pattern 169 are formed on the passivation layer 140 in the pixel region P has the double-layered structure. The pixel electrodes 170 are configured to alternate with the second common electrodes 173 and be located between the first common electrodes 116 at the both sides of the pixel region P. The pixel electrode 170 extends over the pixel region P and has a bar shape like the first and second common electrodes 116 and 173.

It is preferred, but not required, that the lower layer of each of the pixel electrode 170 and the second common electrode 173 has a thickness of about 50 Å to about 250 Å, and the upper layer of each of the pixel electrode 170 and the second common electrode 173 has a thickness of about 200 Å to about 600 Å.

The LCD device of the above-described configuration can have light reflectance reduced to about 39% or less.

As a comparative example, when an IPS mode LCD device including single-layered pixel and common electrodes of 300 Å in thickness made of molybdenum is used, light reflectance for ambient light is about 66%, and this causes a rainbow spot. Accordingly, display quality of the comparative LCD device is much reduced under external circumstances.

However, the LCD device according to the embodiment is configured to have the double-layered pixel and common electrodes, which include the lower layer of about 50 Å to about 250 Å made of at least one of molybdenum (Mo), molybdenum-titanium (MoTi), copper (Cu) and copper nitride (CuNx), and the upper layer of about 200 Å to about 600 Å made of the transparent conductive material. Accordingly, the light reflectance is about 39% or less, and a rainbow spot is thus prevented or reduced. Therefore, display quality can be improved.

When the double-layered structure is configured using two different materials with different thicknesses, the double layers are different in refractive indices. The differences in thickness and refractive index makes anti-reflection effect that lights reflecting from the double layers undergo destructive interference, and intensity of light reflecting from the LCD device can be thus reduced. In more detail, referring to a bottom-side drawing of FIG. 6, to achieve the anti-reflection effect, it is preferred, but not required, that the thickness of the upper layer 170b or 173b is about $\lambda/4$ (where $\lambda$ is a wavelength of ambient light L), and the refractive index of the lower layer 170a or 173a is greater than that of the upper layer 170b or 173b. Under this condition, when the ambient light L is incident on the LCD device 101, the light L reflects from the upper layer 170b or 173b and becomes a first reflected light L1, the light L reflects from the lower layer 170a or 173a and becomes a second reflected light L2, and the first and second reflected lights L1 and L2 are different in phase, by about $\lambda/2$. Accordingly, destructive interference between the reflected lights L1 and L2 occurs, and the final reflected light, which is a sum of the first and second reflected lights L1 and L2 can thus be reduced in intensity. Therefore, the light reflectance can be remarkably reduced.

Figure 7:
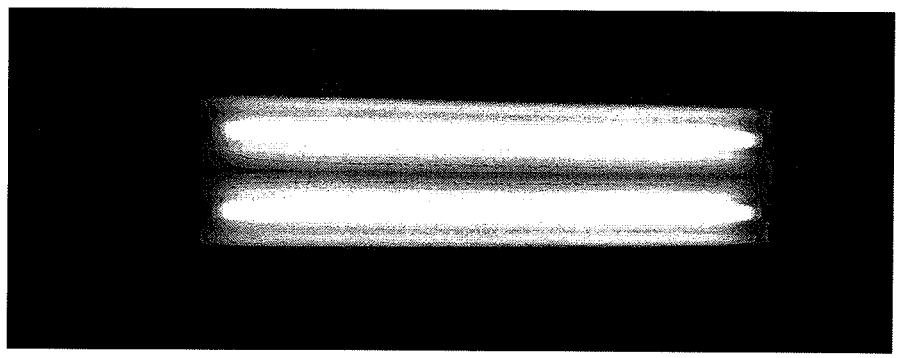
FIG. 7 is a picture of pixel electrodes and surroundings thereof of the LCD device according to an embodiment of the invention when irradiating ambient light.
Figure 8:
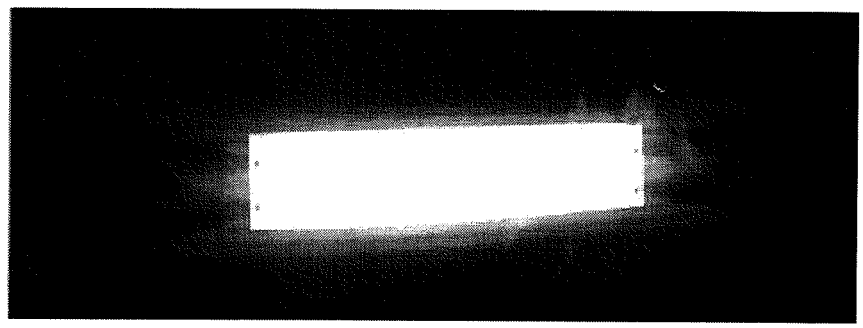
FIG. 8 is a picture of pixel electrodes and surroundings thereof of a comparative LCD device when irradiating ambient light.

FIG. 7 is a picture of pixel electrodes and surroundings thereof of the LCD device according to the embodiment of the invention when irradiating ambient light, and FIG. 8 is a picture of pixel electrodes and surroundings thereof of the comparative LCD device when irradiating ambient light.

Referring to FIG. 7, because of the anti-reflection effect using the double-layered pixel electrode, light reflectance for ambient light is 39% or less. Accordingly, a brightness spot (or a rainbow spot) in the surroundings caused by surface reflection of the pixel electrode (or common electrode) falls under a predetermined level, such as a level II, which satisfies fair quality requirements.

However, referring to FIG. 8, in the instance of the comparative LCD device, reflection of ambient light from the single-layered pixel electrode (or common electrode) is too much, and it is thus shown that rainbow spot occurs. Accordingly, brightness spot in the surroundings falls under a predetermined level, such as a level V, and this adversely affects display quality.

Table 1 shows measurement of reflectance for ambient light according to variation of thickness of a lower layer of the LCD device of the embodiment using double-layered pixel and common electrodes each using MoTi lower layer and ITO upper layer. Table 1 also shows reflectance for ambient light of the comparative LCD device using MoTi single-layered pixel and common electrodes.

TABLE 1

| | Thickness (Å) | | Reflectance (%) |
|---|---|---|---|
| | Lower layer (MoTi) | Upper layer (ITO) | Ambient light (wavelength: 380-780 nm) |
| Embodiment | 300 | 300 | 39 |
| | 200 | 300 | 37 |
| | 100 | 300 | 32 |
| Comparative | 300 | — | 68 |

As shown in Table 1, in the instance of the LCD device of the embodiment of the invention, when the thickness of the ITO upper layer is kept at 300 Å and the thickness of the MoTi lower layer is varied from 100 Å to 300 Å, average reflectances are all 39% or less. Further, the reflectance is less as the thickness of the lower layer is thinner.

However, when the thickness of the lower layer is below 50 Å, an ambient contrast ratio is reduced. Accordingly, it is preferred, but not required, that the thickness of the lower layer is 50 Å or more.

In the instance of the comparative LCD device, the reflectance is 68%. In this instance, rainbow spot occurs, and display quality is thus degraded.

Table 2 shows measurement of reflectance for ambient light according to variation of thickness of an aluminum-doped zinc-oxide (AZO) upper layer of the LCD device of the embodiment using double-layered pixel and common electrodes each using MoTi lower layer and AZO upper layer.

TABLE 2

| | Thickness (Å) | | Reflectance (%) |
|---|---|---|---|
| | Lower layer (MoTi) | Upper layer (AZO) | Ambient light (wavelength: 380-780 nm) |
| Embodiment | 300 | 300 | 35 |
| | 300 | 400 | 31 |
| | 300 | 500 | 21 |
| | 300 | 600 | 22 |

As shown in Table 2, in the instance of the LCD device of the embodiment, when the thickness of the MoTi lower layer is kept at 300 Å and the thickness of the MoTi lower layer is varied from 300 Å to 600 Å, average reflectances are all 35% or less. Further, the reflectance is less as the thickness of the lower layer is thicker, and the reflectance is substantially minimized at thicknesses of 500 Å to 600 Å.

As described above, the LCD device of the embodiment uses the double layered pixel and common electrodes each including the lower layer of at least one of Mo, MoTi, Cu and CuNx and the upper layer of a transparent conductive material. Accordingly, the reflectance for ambient light can be 39% or less. Further, this configuration can make an alignment layer of polyimide (PI) effectively formed on the pixel and common electrodes.

In order to obtain reflectance of 39% or less in an IPS mode LCD device, pixel and common electrodes might be formed using a low reflective and opaque material such as copper nitride (CuNx) to have a single layer of CuNx or double layers of MoTi/CuNx. However, adhesion property of CuNx with polyimide (PI) is much worse than that of the transparent conductive material or MoTi with polyimide (PI).

In particular, in the instance of forming the pixel and common electrodes using the CuNx single layer or a CuNx upper layer of the double layers, when an alignment layer to align liquid crystal molecules is formed on the CuNx single layer or the CuNx upper layer, the alignment layer comes off the surfaces of the pixel and common electrodes due to bad adhesion therebetween. Accordingly, it is difficult to effectively control movement of liquid crystal. This causes more serious degradation of display quality than the degradation of display quality due to reflection of ambient light.

Therefore, the LCD device of the embodiment suggests that the pixel and common electrodes are configured to have the double-layered structure that includes the lower layer of at least one of Mo, MoTi, Cu and CuNx and the upper layer of the transparent conductive material, for example, at least one of indium-tin-oxide (ITO), indium-zinc-oxide (IZO) and aluminum-doped zinc-oxide (AZO).

Figure 9:
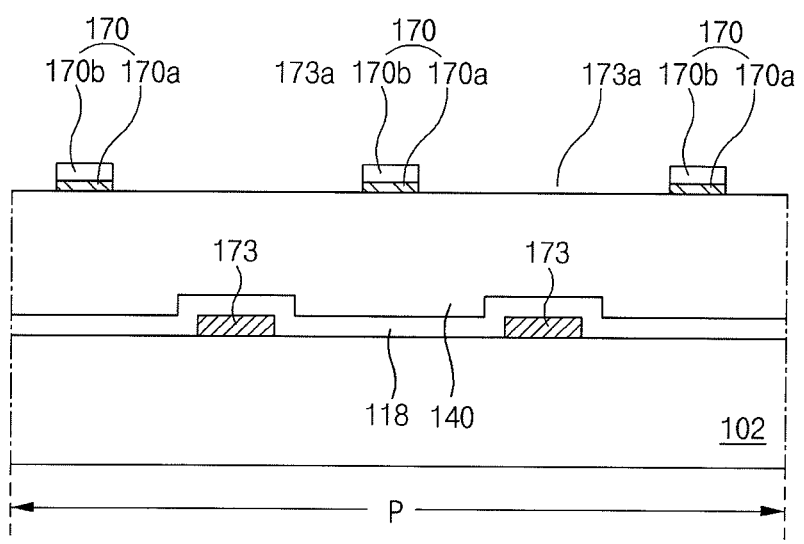
FIG. 9 is a cross-sectional view illustrating an IPS mode LCD device according to another embodiment of the invention.

FIG. 9 is a cross-sectional view illustrating an IPS mode LCD device according to a second embodiment of the invention. The IPS mode LCD device of the second embodiment is similar to that of the first embodiment. Accordingly, explanations of parts similar to parts of the first embodiment may be omitted.

In the first embodiment, both of the pixel and common electrodes are formed at the same layer and directly below the alignment layer and each have double-layered structure to obtain the anti-reflection effect.

However, in the second embodiment, referring to FIG. 9, pixel and common electrodes 170 and 173 may be formed at different layers with at least one insulating layer therebetween, and one of the pixel and common electrodes 170 and 173 may be formed directly below an alignment layer and have a double-layered structure. For the purpose of explanations, in the second embodiment, it is assumed that the pixel electrode 170 is formed at upper layer than the common electrode 173.

The pixel electrodes 170 may include a lower layer 170a made of at least one of Mo, MoTi, Cu and CuNx, and an upper layer 170b made of at least one of ITO, IZO and AZO. The lower layer 170a may have a thickness of about 50 Å to 250 Å, and the upper layer 170b may have a thickness of about 200 Å to 600 Å.

The common electrodes 173 may have a single-layered structure. However, it should be understood that the common electrodes 173 may have a multiple-layered structure, for example, a double-layered structure similar to the pixel electrodes 170. The common electrodes 173 may be formed at the same layer as the gate line (103 of FIG. 4) and of the same material as the gate line, and in this instance, the common electrodes 173 may extend from the common line (109 of FIG. 4).

In the second embodiment, one of the pixel and common electrodes 170 and 173 formed at an upper side has the double-layered structure to achieve the anti-reflection effect. Accordingly, light reflectance can be reduced, and display quality can be improved. Further, an alignment layer can be effectively formed directly on the one of the pixel and common electrodes 170 and 173 having the double-layered structure.

As described in the above embodiments of the invention, at least one of the pixel and common electrodes is configured to achieve the anti-reflection effect. Accordingly, light reflectance can be reduced, and display quality can be improved.

It will be apparent to those skilled in the art that various modifications and variations can be made in the invention without departing from the spirit or scope of the invention. Thus, it is intended that the invention cover the modifications and variations of this invention provided they come within the scope of the appended claims and their equivalents.

What is claimed is:

1. A liquid crystal display device, comprising:
a substrate;
gate and data lines crossing each other on the substrate to thereby define a pixel region;
a thin film transistor connected to the gate and data lines and having a drain electrode;
a storage capacitor connected to the drain electrode;
a plurality of pixel electrodes and a plurality of first common electrodes alternating with each other in the pixel region and configured to induce an in-plane electric field, and each including a first layer and a second layer on the first layer;
a passivation layer on the thin film transistor and the storage capacitor;
an auxiliary common pattern on the passivation layer; and
an auxiliary pixel pattern on the passivation layer,
wherein the first layer is placed over the substrate and on the passivation layer, and the second layer is placed on the first layer,
wherein the first layer is made of an opaque metal and has a first thickness, and the second layer is made of a transparent conductive material and has a second thickness,
wherein the second thickness is about $\lambda/4$, where $\lambda$ is a wavelength of an ambient light,
wherein a refractive index of the first layer is greater than a refractive index of the second layer,
wherein the auxiliary common pattern and the auxiliary pixel pattern are parallel with the gate line and are opposite to each other in the pixel region, and wherein the auxiliary common pattern and the auxiliary pixel pattern each include the first and second layers.

2. The device according to claim 1, wherein the first layer is at least one of molybdenum, molybdenum-titanium (MoTi), copper (Cu) and copper nitride (CuNx), and the second layer is at least one of indium-tin-oxide (ITO), indium-zinc-oxide (IZO) and aluminum-doped zinc-oxide (AZO).

3. The device according to claim 2, wherein the first thickness is about 50 Å to about 250 Å, and the second thickness is about 200 Å to about 600 Å.

4. The device according to claim 1, further comprising:
a common line parallel with the gate line; and
a plurality of second common electrodes connected with the common line and located at both sides of the pixel region,
wherein the plurality of pixel electrodes and the plurality of first common electrodes are located between the plurality of second common electrodes at the both sides of the pixel region.

5. The device according to claim 4, wherein a portion of the common line is a first storage electrode, and a portion of the drain electrode of the thin film transistor overlapping the first storage electrode is a second storage electrode, and
wherein the first and second storage electrodes form the storage capacitor along with a gate insulating layer therebetween.

6. The device according to claim 5, wherein the plurality of pixel electrodes and the plurality of first common electrodes are on the passivation layer.

7. The device according to claim 6,
wherein the auxiliary common pattern is connected with first ends of the plurality of first common, and
the auxiliary pixel pattern is connected with first ends of the plurality of pixel electrodes.

8. The device according to claim 7, further comprising a conductive pattern on the passivation layer, corresponding to the data line and the plurality of second common electrodes, and connected to the auxiliary common pattern.

9. The device according to claim 7, wherein the passivation layer includes a drain contact hole exposing the drain electrode, and a common contact hole exposing one second common electrode, wherein the auxiliary pixel pattern contacts the drain electrode through the drain contact hole, and wherein the auxiliary common pattern contacts the one second common electrode through the common contact hole.

10. The device according to claim 1, wherein the data line, the plurality of pixel electrodes, and the plurality of first common electrodes are bent with respect to a center of the pixel region to form dual domains in the pixel region.

11. The device according to claim 1, further comprising an alignment layer directly on the plurality of pixel electrodes and the plurality of first common electrodes.

12. A liquid crystal display device, comprising:
a substrate;
gate and data lines crossing each other on the substrate to thereby define a pixel region;
a thin film transistor connected to the gate and data lines and having a drain electrode;
a storage capacitor connected to the drain electrode;
a plurality of pixel electrodes and a plurality of common electrodes alternating with each other in the pixel region and configured to induce an in-plane electric field, and the plurality of pixel electrodes or the plurality of common electrode include a first layer and a second layer on the first layer;

a passivation layer on the thin film transistor and the storage capacitor;

an auxiliary common pattern on the passivation layer; and an auxiliary pixel pattern on the passivation layer, wherein the first layer is placed over the substrate and on the passivation layer, and the second layer is placed on the first layer, wherein the first layer is made of an opaque metal and has a first thickness, and the second layer is made of a transparent conductive material and has a second thickness, wherein the second thickness is about $\lambda/4$, where $\lambda$ is a wavelength of an ambient light, wherein a refractive index of the first layer is greater than a refractive index of the second layer, wherein the auxiliary common pattern and the auxiliary pixel pattern are parallel with the gate line and are opposite to each other in the pixel region, and wherein the auxiliary common pattern and the auxiliary pixel pattern each include the first and second layers.

13. The device according to claim 12, wherein an insulating layer is disposed between the plurality of pixel electrodes and the plurality of common electrodes.

14. The device according to claim 13, wherein the plurality of pixel electrodes or the plurality of common electrode is formed on the insulating layer.

15. The device according to claim 12, wherein the first layer is at least one of molybdenum, molybdenum-titanium (MoTi), copper (Cu) and copper nitride (CuNx), and the second layer is at least one of indium-tin-oxide (ITO), indium-zinc-oxide (IZO) and aluminum-doped zinc-oxide (AZO).

16. The device according to claim 12, wherein the first thickness is about 50 Å to about 250 Å, and the second thickness is about 200 Å to about 600 Å.

17. The device according to claim 12, further comprising an alignment layer directly on the plurality of pixel electrodes and the plurality of common electrodes including the first and second layers.

* * * * *